United States Patent Office

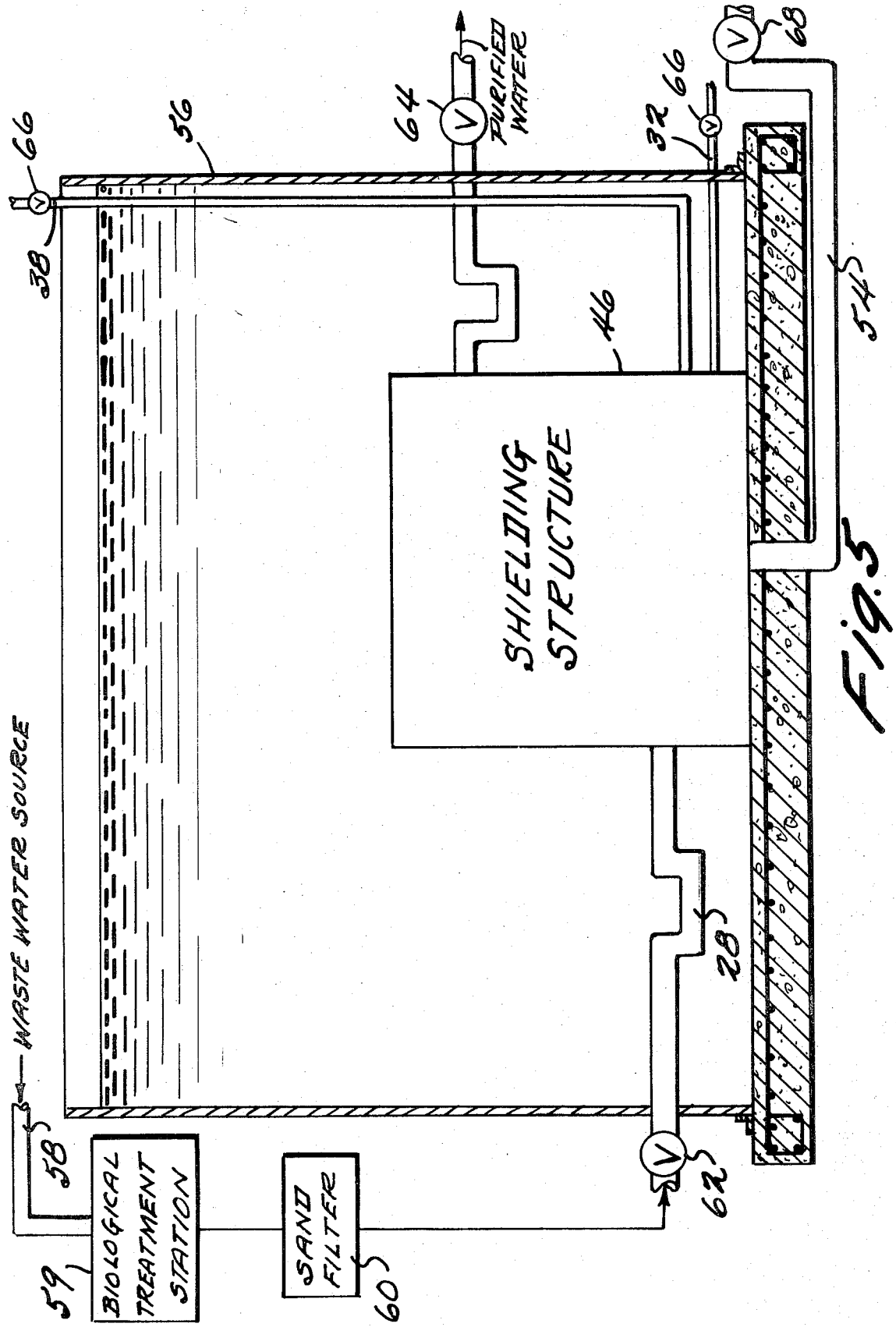

3,846,296
Patented Nov. 5, 1974

3,846,296
WASTE WATER PURIFICATION SYSTEM
William C. Hay, 941 Jefferson Ave.,
East Point, Ga. 30344
Filed Dec. 9, 1971, Ser. No. 206,444
Int. Cl. B01d 15/06
U.S. Cl. 210—27                         14 Claims

ABSTRACT OF THE DISCLOSURE

Waste water from industrial and/or domestic sources is passed through a filtering stage then through conventional treatment as at a biological treatment station in which the waste water is exposed to organic flocculent materials to break down organic solids suspended in the waste water and then this treated waste water is filtered through a bed of sand. This treatment removes the major portion of the suspended solid materials from the waste water. Then, the waste water is passed through a bed of activated charcoal contained within an irradiation tank upon which organic contaminates dissolved within the waste water are deposited. The absorbent activated charcoal is regenerated by means of gamma radiation issuing from an energy basket contained within the radiation tank which holds the activated charcoal. The tank is surrounded by a heavy shield of concrete material and the entire shielded structure is submerged within a tank of water to prevent radiation escape.

BACKGROUND OF THE INVENTION

The present invention relates to a purification of waste water and, more particularly, to the removal from waste water of dissolved organic contaminates.

Waste water which includes, but is not limited to, water originating from specific industries including oil refineries, breweries and chemical plants as well as municipal sources and agricultural sources, poses a growing problem to America's water ways. The removal of suspended solids within waste waters including organic contaminates suspended in such waters has long been practiced by such expedients as the addition of organic flocculent materials to the waste waters which produces aerobic or anaerobic digestion of these wastes. Usually, a filtering process which utilizes a bed of sand or the like follows the organic digestion and removes the above mentioned suspended solids from the waste water and the flocculent material is destroyed by chlorination or irradiation.

It is also known to the waste water treatment art to utilize the absorptive capacity of a bed of activated carbon to collect dissolved organic contaminates. A major problem with using activated carbon, however, is that this material eventually reaches its limits of absorption and then it is necessary to either replace the activated carbon or regenerate it. It is known to regenerate activated carbon by means of wet or dry air oxidation which oxidizes the organic materials and the surface layers of the charcoal itself, or to use ozone and air oxidation for the same purpose or to supply chlorine treatment thereto. It is the purpose of each of the above methods to destroy the absorbed organic contaminates, but in the process the carbon bed itself is adversely affected. For example, the internal core structure of the carbon granules is disturbed during such treatment which reduces the effectiveness of the bed.

SUMMARY OF THE INVENTION

In order to regenerate an activated carbon bed utilized in the treatment of waste water without causing damage to that bed, the applicant proposes to utilize a source of gamma radiation so located as to irradiate the activated carbon bed which breaks down the organic materials dissolved upon the bed. The applicant's process and his apparatus for carrying out this porcess are advantageous over the prior art in that they do less damage to the activated carbon bed. Also, the applicant's process is essentially continuous whereas the processes known to the prior art require periodic shut down of the through put in order to regenerate the activated carbon bed. It is possible, however, in the applicant's apparatus to backwash the carbon bed by use of a flushing line and a drain connected to the bottom of the irradiation tank containing the activated charcoal bed so as to remove therefrom the residual solids such as sand, silt or the like which gradually accumulate therein. The applicant's irradiation tank is enclosed within a concrete structure designed to shield the energy source while the entire shielding and irradiation tank are submerged within a larger tank filled with water which acts as a secondary radiation shield.

BRIEF DESCRIPTION OF THE DRAWINGS

The preferred embodiment of the applicant's invention will now be described with reference to the drawings in which:

FIG. 5 is a figure, partly in schematic form, showing the direction of passage of waste water through the applicant's device and, in addition, showing the disposition of a tank of water around the shield structure.

The same elements are indicated by the same reference numerals throughout the figures.

DETAILED DESCRIPTION OF THE PREFERRED EMBODIMENT

Figure 1:
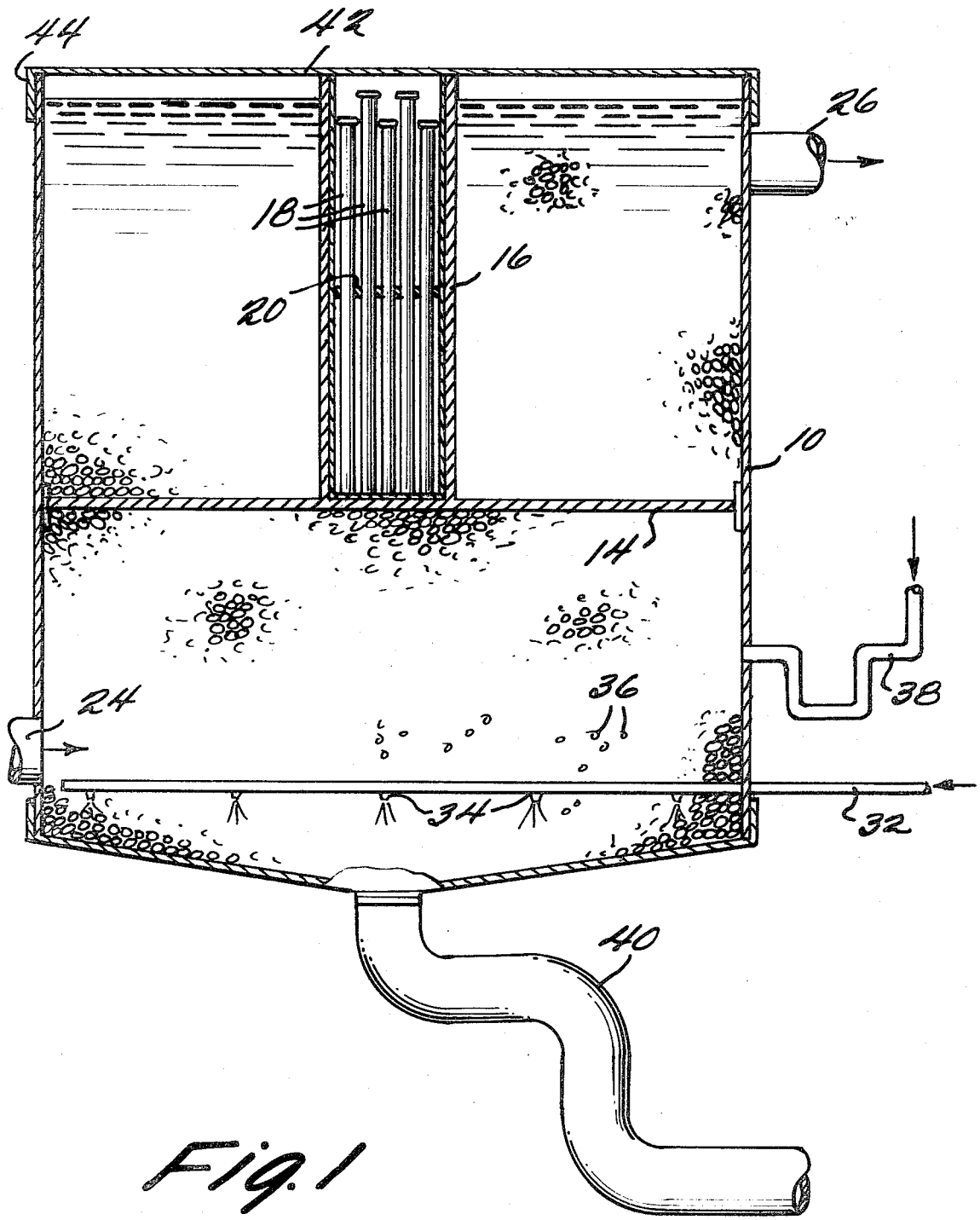
FIG. 1 presents a cross sectional view along the center line of the irradiation tank in accordance with the applicant's invention.
Figure 2:
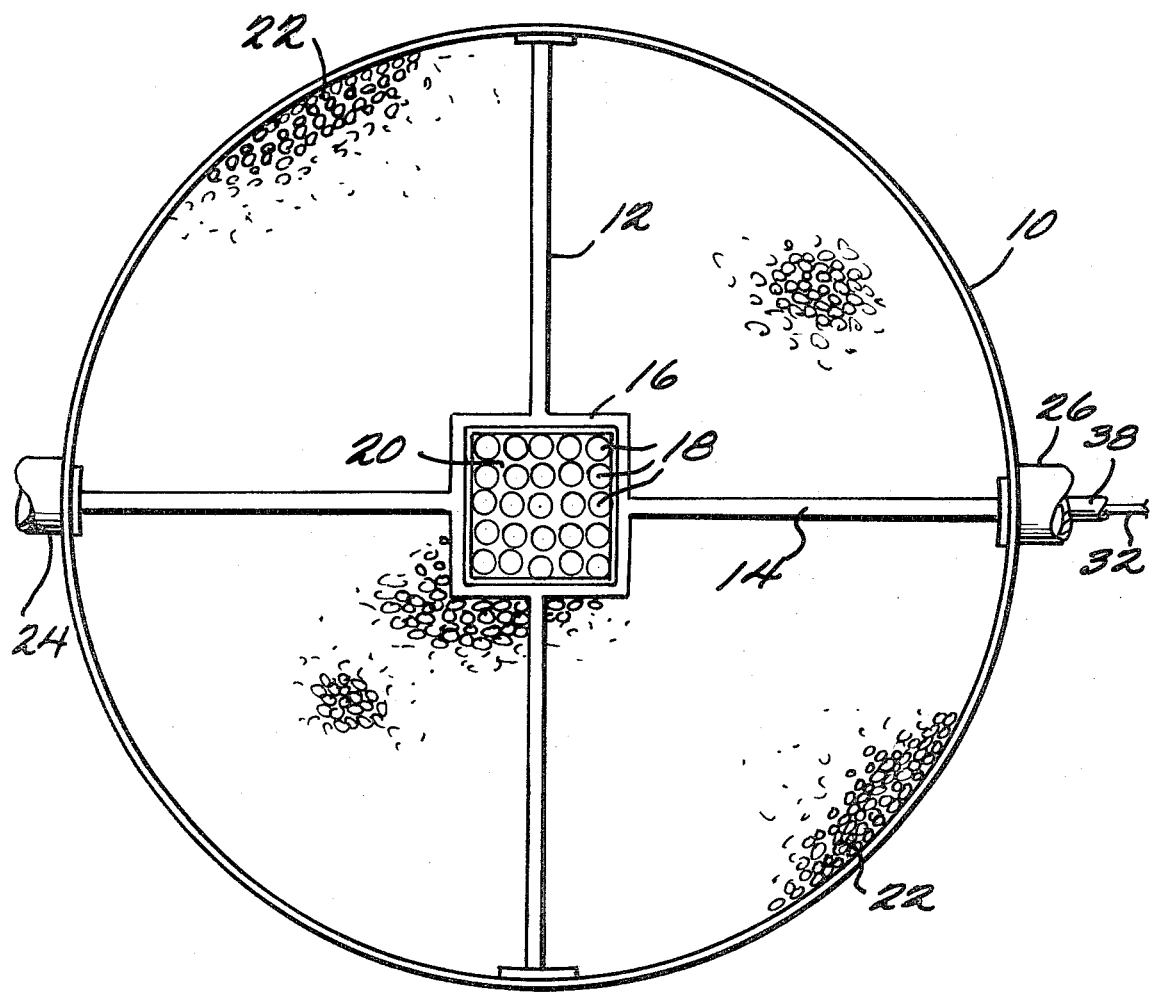
FIG. 2 is a top view of the irradiation tank shown in FIG. 1 with the cap removed.

Referring to FIG. 1, an irradiation tank 10 is disclosed which may be seen from FIGS. 1 and 2, taken in combination, to have a generally cylindrical form. Tank 10 is preferably fabricated from 10 gage stainless steel sheets.

Irradiation tank 10 includes a pair of intercepting brace members 12 and 14 which intersect at the axis of irradiation tank 10 to support an energy basket 16. The energy basket 16 contains 25 cylinders 18 which are separated from one another by means of a bracket 20. The cylinders 18 are filled with a source of gamma radiation as, for example, cobalt 60 or cesium 137.

Completely surrounding the energy basket 16 and almost completely filling the irradiation tank 10 is a bed of activated carbon 22. The activated carbon employed should have a large surface area per weight and may, for example, be prepared from a carbonaceous material such as coal, petroleum oil fractions, wood and coconut shells, or oil refineries sludges. In any case, such activated carbons are commercially available and do not form per se the invention.

The waste water to be treated enters irradiation tank 10 through an inlet 24 disposed near the bottom of the irradiation tank 10. Water then filters upwards through the activated carbon bed 22 and deposits thereupon organic contaminates dissolved within the waste water. The inlet 24 operates at a pressure sufficient to force the waste water upwards through activated carbon bed 22 and out the outlet 26. It is to be noted that a high inlet pressure is not required for proper functioning of the irradiation tank. It is noted further that both the inlet and the outlet lines include traps 28 and 30 which prevent gamma radiation from passing out in a straight path along the inlet and outlet ducts.

Irradiation tank 10 also includes an air line 32 disposed near the bottom of said tank which is connected to a pressurized source of air and introduces through air jets 34 a source of air bubbles 36 for agitating the waste water during its passage through irradiation tank 10 to thereby enhance the interaction between the waste water and the activated bed of carbon 22.

Finally, the irradiation tank 10 also includes a flush line 38 which is connected to a source of high presure water through a valving means for flushing, i.e. back washing the activated carbon bed 22 on an infrequent basis as when it is desirable to remove solid particles such as grains of sand which have collected within the irradiation tank. Flushing is accomplished through a drain line 40 disposed at the bottom of irradiation tank 10 and is controlled by a drain valve 68 which is seen in FIG. 5. Because irradiation tank 10 operates at low pressure, it is not necessary to provide a cap for the tank, however, a cap 42 having a depending flange 44 may be disposed about irradiation tank 10 in order to prevent splashing or evaporation of water therefrom. Both the flush and drain lines, 38 and 40 respectively, have bends or traps to retain radiation within tank 10.

Figure 3:
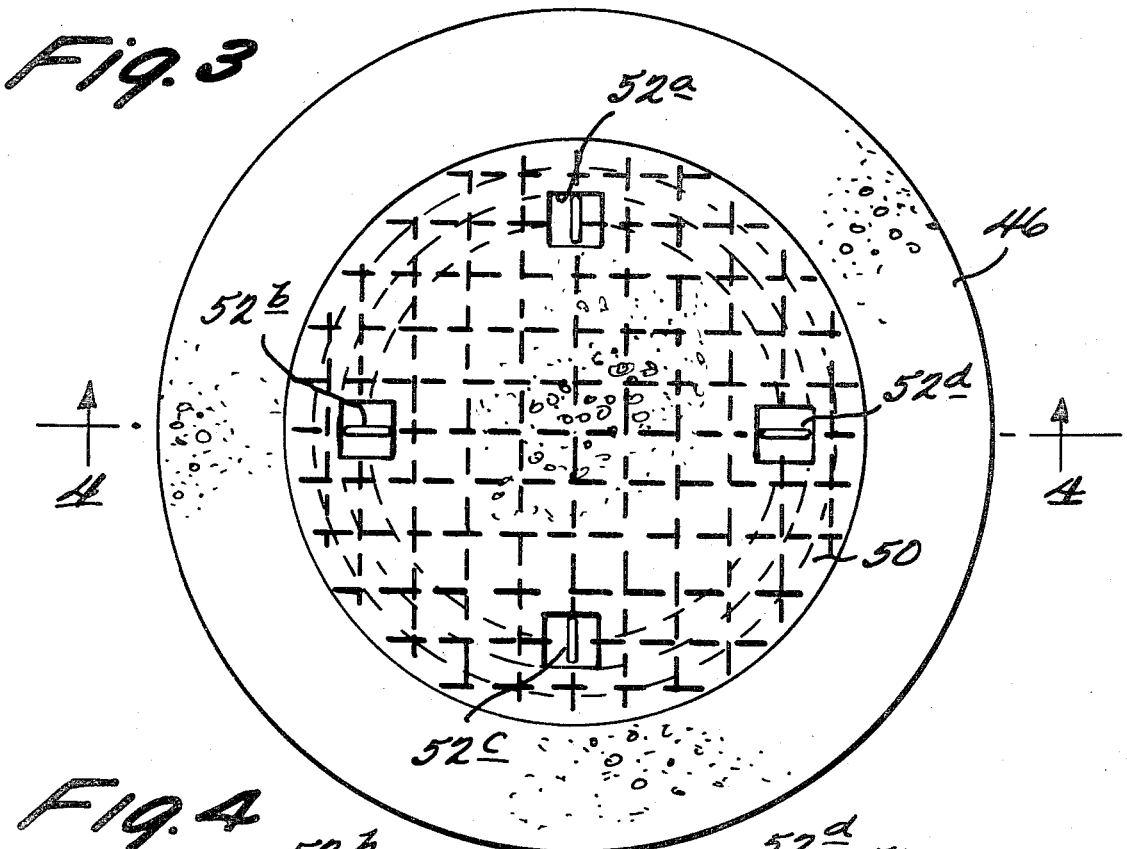
FIG. 3 is a top view of the shielding structure enveloping the irradiation tank of FIG. 1.
Figure 4:
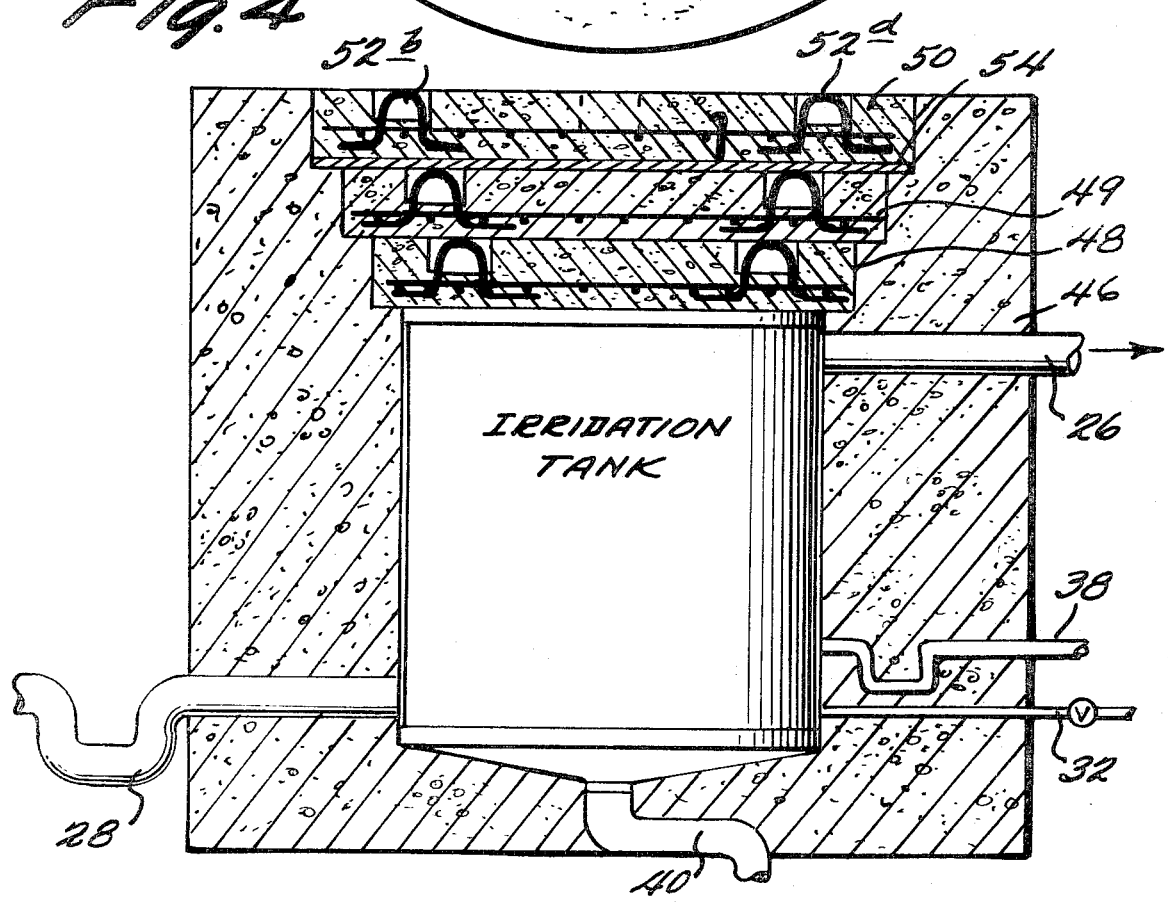
FIG. 4 is a cross sectional view of the tank along the line 4—4 in FIG. 3 showing the shielding structure in section and the tank and lines in full.

Turning to FIGS. 3 and 4, it is seen that irradiation tank 10 is completely enclosed within a shield structure 46 which may be formed from concrete or other dense material. The shielding structure 46 is formed into dimensions appropriate to absorb essentially all gamma radiation escaping from irradiation tank 10 and to resist mechanical stresses induced by deformation of irradiation tank 10. Further, the internal dimensions of shielding structure 46 are slightly greater than the external dimensions of the irradiation tank 10, on the order of ⅛ of an inch, so that the tank 10 fits perfectly into the shield, and the shield prevents expansion or distortion in excess of an allowed amount.

The connections between irradation tank 10 and the inlet, outlet, flushing, air and drain lines may be completed from inside the irradiation tank once it it in place if these respective lines have been previously cast in shielding structure 46. Alternatively, the lines may be assembled to the irradiation tank 10 and the shielding structure may then be cast about the irradiation tank in such a manner as to leave a small tolerance between the tank and the shielding structure.

In either case, in order to allow for removal and recharging of the irradiation sources, it is necessary to provide a removable cover for the shielding structure. However, a single cover provides unsuitable radiation absorption qualities and therefore, a plurality of concentric covers 48, 49 and 50 are utilized in the preferred embodiment. It is noted that these covers 48–50 are circular and concentric about a single axis which is the central axis of irradiation tank 10 and that each of these covers includes a lifting means such as hooks 52a through 52d which allow the heavy covers to be removed by known lifting devices. In order to further enhance the absorption qualities of the covers a layer of lead plate such as shown at plate 54 attached to the bottom of cover 50 may be tied to one or more of the covers.

Referring to FIG. 5, it is seen that the entire shielding structure 46 as described with reference to FIGS. 3 and 4 is itself enclosed within a larger tank 56 which is preferably fabricated from panels of quarter inch thick sheet steel which are welded together to form a cylindrical tank which rests upon a reinforced concrete base 57. Tank 56 is made in a waterproof manner so as to contain an amount of water which covers this shielding structure and provides, along with shielding structure 46, a secondary safety device to prevent radiation leakage from the irradiation tank 10.

Reference to FIG. 5 also indicates the passage of waste water through the applicant's apparatus and better describes the totality of his method. Thus, it is seen that waste water from a source of waste water 58 passes through a biological treatment station 59 where it is exposed to a flocculent material in a known manner to remove organic suspended solids. From this station the waste water then passes through a sand filter or its equivalent 60 where the majority of solid particulate matter including suspended organic solids is removed.

Thus, the water entering inlet line 24 through an inlet valve 62 includes essentially only dissolved organic contaminates. As described above, this contaminated waste water then passes the trap 28 in inlet line 24 and into irradiation tank 10 whereupon the organic contaminates are absorbed within activated carbon bed 22 and cleaned effluent water passes out through outlet line 26, trap 30 and outlet valve 64.

As has also been noted before pressurized air may be introduced to the irradiation tank 10 via air line 32 to agitate the waste water passing through the irradiation tank and thereby increase the effectiveness of the activated carbon bed. A valve 66 is provided on air line 32 ouside of tank 52 for this purpose. Also, as discussed above, the activated bed 22 may be backwashed by means of flush line 38 which is controlled by means of a valve 66 located above the water level in tank 52. Similarly, valve 68 on drain line 40 is disposed outside of tank 52 and above the base 54 thereof. Thus, all the operations of irradiation tank 10 are operable from without the tank 52.

Of course, the size of the components and the amount of radiation source utilized depend upon the desired throughput for the waste purification process. For example, in a process which purifies a million gallons per day, an activated carbon bed of approximately 6000 pounds of activated carbon would be used and the net volume of the irradiation tank 10 would be about 360 cubic feet. In this case, external tank 56 might have external diameter of 32 feet and 6 inches, a height of about 26 feet and the shielding structure 46 might have dimensions about 16 feet, 6 inches in diameter and 14 feet in height while irradiation tank itself may be approximately 8 feet in height and 7 feet 7½ inches in diameter. To handle the above throughput, the inlet and outlet and drain lines should be about 8 inches in diameter and the flush line should be about 2 inches in diameter. A half inch in diameter air line would also be suitable and stainless steel materials could be utilized throughout the lines. Finally, the cylinders 18 should be between 4 feet, 2 inches and 3 feet, 11 inches tall and approximately 2 inches in diameter and the brace members 12 and 14 could be 1 x 1 inch square cross sectional stainless steel bars.

Of course, if a different throughput were designed from this system, a different size apparatus would be necessary. Also, other changes in the applicant's apparatus are possible within the scope of his invention. Therefore, it is necessary to review the following claims to ascertain this scope of the applicant's invention.

What is claimed is:

1. A method of treating liquid organic waste effluent comprising the steps of:
   (a) removing by filtration a major portion of solid waste materials from the effluent,
   (b) passing the filtered effluent through a bed of activated carbon which causes the organic waste material to be absorbed by said bed,
   (c) continuously exposing the bed of activated carbon to gamma radiation to continuously induce oxidation of said organic waste material, and
   (d) continuously passing a gaseous medium containing oxygen through said bed of activated carbon to provide oxygen for combination with said organic waste to continuously regenerate said bed.

2. The method as claimed in claim 1 including the step of periodically backwashing the bed of activated carbon to remove solid waste materials not previously removed by filtration.

3. The method as claimed in claim 1 wherein said bed of activated carbon is contained in a tank having a top and bottom wall and a side wall and a source of gamma radiation is disposed within said tank and including the steps of pumping said filtered effluent into the bottom of said tank and withdrawing the effluent from the top thereof.

4. The method as claimed in Claim 2 wherein said radiation source is located approximately centrally in said tank.

5. The method as claimed in Claim 1 wherein the rate of passage of filtered effluent through said bed of activated carbon is approximately 1 million gallons a day and said bed comprises approximately 6,000 pounds of activated carbon.

6. An apparatus for treating liquid organic waste effluent comprising a vessel having liquid tight sides and bottom and containing a large amount of activated charcoal, inlet and outlet lines, a drain line and a flush line connected to said vessel, said flush line also being connected to a pressurized source of water and a receptacle within said vessel containing a source of gamma radiation and means for introducing pressurized air into the vessel.

7. The apparatus of Claim 6 wherein said receptacle further includes a plurality of containers each of which contains a source of gamma radiation.

8. The apparatus of Claim 6 wherein the means for introducing pressurized air into the vessel includes an air line which is connected to a pressurized source of air and including at least one aperture within said vessel for introducing a gaseous medium containing oxygen into said vessel.

9. The apparatus of Claim 7 further including a shielding structure of dense material entirely surrounding the sides and bottom of said vessel and at least one cover of dense material disposable on a top portion of said shielding structure so as to completely enclose said vessel, said cover and said shielding structure having appropriate dimensions to absorb substantially all gamma radiation escaping from said vessel.

10. The apparatus of Claim 9 wherein there are a plurality of concentric circular covers each subsequently emplaced cover being larger in diameter than the previously emplaced cover.

11. The apparatus of Claim 10 wherein at least the outermost cover includes a layer of lead upon its side facing said vessel.

12. The apparatus of Claim 10 wherein each of the covers includes recessed lifting devices upon its side facing away from said vessel and said covers are placed in a stack upon one another.

13. The apparatus of Claim 9 further including a tank having internal dimensions greater than said shielding structure and adapted to contain a fluid so as to completely immerse said shielding structure in said fluid.

14. The apparatus of Claim 9 wherein said shielding structure has internal dimensions slightly in excess of the external dimensions of said vessel so that said vessel may be inserted into said shielding structure but extensive expansion of said vessel is prevented by said shielding structure.

References Cited
UNITED STATES PATENTS

| | | | |
|---|---|---|---|
| 3,455,820 | 5/1967 | Joyce et al. | 210—40 |
| 2,905,608 | 9/1959 | Noddings et al. | 252—411 X |
| 800,187 | 9/1905 | Venable | 210—150 X |
| 2,587,425 | 4/1949 | Adams et al. | 252—411 X |
| 3,635,817 | 1/1972 | Zuckerman et al. | 210—40 X |

SAMIH N. ZAHARNA, Primary Examiner

I. CINTINS, Assistant Examiner

U.S. Cl. X.R.

210—30, 40, 63, 274; 252—411 R